United States Patent [19]

Coale

[11] Patent Number: 5,534,138
[45] Date of Patent: Jul. 9, 1996

[54] FUEL SEPARATOR APPARATUS

[76] Inventor: Christopher F. Coale, 1501 S. Front, Angleton, Tex. 77515

[21] Appl. No.: 429,351

[22] Filed: Apr. 26, 1995

[51] Int. Cl.$^6$ ............................................. B01D 17/038
[52] U.S. Cl. ........................... 210/86; 210/187; 210/304; 210/305; 210/312; 210/320; 210/512.1; 210/522; 210/533; 210/540
[58] Field of Search ............................ 210/86, 187, 320, 210/512.1, 801, 519, 533, 534, 535, 540, 521, 522, 304, 305, 312, 313

[56] References Cited

U.S. PATENT DOCUMENTS

| | | | |
|---|---|---|---|
| 3,362,534 | 1/1968 | Kay | 210/320 |
| 4,081,373 | 3/1978 | Rozniecki | 210/512.1 |
| 4,597,653 | 4/1986 | Davis | 210/86 |
| 4,986,907 | 1/1991 | Uzeta | 210/187 |

*Primary Examiner*—Matthew O. Savage
*Attorney, Agent, or Firm*—Harrison & Egbert

[57] ABSTRACT

An apparatus for separating a contaminated liquid diesel fuel and the like into a substantially uncontaminated homogeneous raffinate fuel portion and into a heterogeneous extract portion. Upon being subjected to sufficient circular flow, in an environment emulating the action of a centrifuge, the heavier liquid and solid components are caused to gravitate out of the diesel fluid and the like. This apparatus is constructed with an elongated housing means which is preferably disposed between the fuel tank and fuel filter of a diesel engine and the like. Contained longitudinally within the elongated housing is a separator chamber having a portion of a frustoconically shaped centrifugation surface which directs the incoming impure and contaminated fuel mixture into a turbulent and circular pattern. As the fuel mixture gains momentum during this centrifuge-like flow pattern, it abruptly strikes a substantially vertical impact plate which precipitates the forced separation of the impurities and contaminants from the fuel. The heavier extract component gravitates to a sump region located in the bottom of the housing, while the lighter fuel raffinate component rises into a raffinate separation region located in the top of the housing. A combination of baffle plates both promote the separation of the extract from the fuel raffinate and prevent the re-mixing thereof, once separation occurs. The accumulated extract portion is discharged through a drain at the bottom of the housing and fuel raffinate is discharged to a downstream fuel filter through an outlet located in the top portion of the housing.

10 Claims, 4 Drawing Sheets

FUEL SEPARATOR APPARATUS

BACKGROUND OF THE INVENTION

This invention relates to fuel for internal combustion engines, and more particularly relates to means for separating contaminants from diesel fuel and the like, before the diesel fuel is delivered to the fuel filter from the fuel tank.

As is well known by those skilled in the art, the efficient operation of a conventional diesel engine and the like is contingent upon the presence of "clean" fuel, i.e., fuel free from contaminants and the like. As is appreciated by those conversant in the art, diesel fuel and the like tend to become contaminated with liquids such as water, and with particulate solids such as sand, rust, fungus, dirt, etc. Such contaminants are typically introduced into internal combustion engines while fuel is being replenished in a fuel tank, from rust or corrosion by-products being formed while the fuel is stored in the fuel tank, through leaks in the fuel system or related systems, etc.

Particulate solids are, of course, suspended in diesel fuel stored in a fuel tank and are subjected to the remedial action of fuel filters, prior to being delivered to the diesel engine. Depending upon the design of a fuel filter, and, whether such filter is sufficiently clean to be effective, at least some of these contaminants and impurities will be separated from the fuel before reaching the engine. But even the presence of minor amounts of water in diesel fuel cause maintenance problems which are exacerbated during cold weather. Obviously, while frequent maintenance checks of fuel filters and the like promote efficient operation of diesel engines and the like, such planned maintenance cannot assure that filters will be timely replaced to not only maximize fuel utilization, but also minimize pollution to the environment.

There have been several developments in the art to promote the efficient operation of the internal combustion engine by minimizing the intrusion of contaminants and impurities into the engine concomitantly with the fuel. These developments have generally sought to purify the fuel before being delivered to diesel engines and the like, by separating the contaminants and impurities from the fuel prior to the fuel being received by the internal combustion engine via conventional oil filters. For example, in U.S. Pat. No. 3,362,534, Kay discloses a fuel-water separation apparatus in which water entrained in fuel is separated therefrom by mechanical action. More particularly, the Kay apparatus causes the water-fuel mixture to flow along an inclined, roughened and scabrous surface wherein water droplets coalesce to form globules which gravitate to the bottom thereof. According to Kay, prerequisite to separation of entrained water from fuel is the laminar flow of the contaminated fuel along the roughened surface to avoid sustaining the entrained condition, on the one hand, and to avoid re-entraining the water globules, on the other hand. The Kay apparatus is constructed with a baffle shaped like a segment of a cylinder which is designed to achieve laminar flow in a cylindrical tank.

As another example, Shepherd, in U.S. Pat. No. 4,789,098, teaches an apparatus which improves upon the hereinbefore described Kay fuel-water separation technique by including a heated baffle plate with a degree of roughness selected to provide enhanced moisture separation efficiency. Constructed with parabolically shaped depressions, the Shepherd baffle plate promotes surface contact with the laminar-flowing fluid.

Contrary to the teachings of Kay and Shepherd, Uzeta teaches in U.S. Pat. No. 4,986,907 a fuel purifying apparatus which effects separation of water and other contaminant from fuel by the action of turbulent fluid flow instead of laminar flow. The Uzeta apparatus comprises a fuel discharging orifice adjacent a heated metal deflector plate which extends diametrically and longitudinally in an elongated shell. Fluid discharged onto the angularly positioned deflector plate flows in a circular motion, causing turbulent flow thereof. Impurities and the like which are heavier than diesel fuel gravitate to the bottom of the shell, for discharge.

Notwithstanding these and related developments in the art, there appears to be no apparatus which provides sufficient centrifugal fluid flow to enable effective separation of contaminants and impurities from diesel fuel and the like, and simultaneously prevent re-mixing of the separated components with the virgin fuel. Thus, it would be advantageous to utilize an apparatus which generates sufficient turbulent, circular fluid flow to promote the gravity-separation of impurities and the like from fuel, but which inherently controls and isolates the respective flow of the fuel and the gravitating or already gravitated impurities, to prevent inadvertent re-mixing thereof. Accordingly, these limitations and disadvantages of the prior art are overcome with the present invention, and improved means and techniques are provided which are useful for effectively and permanently separating impurities and contaminants from diesel fuel and the like, prior to the fuel reaching conventional fuel filter and then the internal combustion engine.

SUMMARY OF THE INVENTION

The present invention provides an improved apparatus for separating a contaminated liquid diesel fuel and the like into a substantially uncontaminated homogeneous raffinate fuel portion and into a heterogeneous extract portion. As will be appreciated by those skilled in the art, the present invention functions on the basis that the impurities and contaminants constituting the extract portion of the diesel fuel have a higher specific gravity than the virgin fuel. Accordingly, upon being subjected to sufficient circular flow, in an environment emulating the action of a centrifuge, the heavier liquid and solid components are caused to gravitate out of the diesel fluid and the like.

The present invention is constructed with an elongated housing means which is preferably disposed between the fuel tank and fuel filter of a diesel engine and the like. Contained longitudinally within the elongated housing means is a separator chamber having a frustoconically shaped centrifugation means which directs the incoming impure and contaminated fuel mixture into a turbulent and circular pattern. According to the present invention, as the fuel mixture gains momentum during this centrifuge-like flow pattern, it abruptly strikes a substantially vertical impact plate which precipitates the forced separation of the impurities and contaminants from the fuel. That is, as will be appreciated by those skilled in the art, fluid flowing under the influence of centrifugal force tends to exhibit a circular pattern with the heavier liquid and solid being thrust radially toward the circumferential boundary of the separator chamber. When this turbulent flow of the fuel mixture is interrupted by the impact plate, the momentum is converted to an equivalent impulse, which causes the heavier extract components to gravitate to a sump region located in the bottom of the housing means, while the lighter fuel component is caused to rise into a raffinate separation region located in the top of the housing means. As will be hereinafter described in detail, the present invention includes a combination of baffles which both promote the separation of the extract from the fuel raffinate and prevent the re-mixing thereof, once separation occurs.

The present invention also includes a drain means to discharge the accumulated extract, upon an extract level sensor means indicating that sufficient extract has been collected to justify actuating this discharge. As will be appreciated by those skilled in the art, notwithstanding the precautions to prevent re-mixing of the separated raffinate and extract, if the extract is not timely discharged from the housing means, such re-mixing will become unavoidable.

Thus, the present invention provides a fuel separator apparatus which provides a means for separating diesel fuel and the like from contaminants and impurities with a reliability and efficiency heretofore unknown in the art.

It is an object of the present invention to provide an apparatus for purifying diesel fuel and the like before the fuel reaches the internal combustion engine.

It is another object of the present invention to provide an apparatus for intercepting diesel fuel and the like, prior to its traveling from the fuel tank to fuel filter means, to extract contaminants and impurities from the fuel, thereby promoting filter and internal combustion engine longevity.

It is still another object of the present invention to provide an apparatus comprising a novel centrifuge-like separator means for extracting contaminants and impurities from a fuel mixture, thereby isolating a raffinate fuel portion which is delivered to an internal combustion engine to assure efficient fuel consumption and to further assure minimal intrusion into the ambient of by-products and the like caused by conventional incomplete fuel combustion.

It is yet another object of the present invention to provide an apparatus for purifying diesel fuel and the like, to augment and precede the conventional purifying procedure of fuel filters in the internal combustion engine, by separating virginal fuel from contaminants and impurities under centrifuge-like turbulent fluid flow conditions.

It is still another object of the present invention to provide an apparatus for expediting the separation of contaminants and impurities from fuel mixtures and simultaneously inherently preventing the inadvertent re-mixing of the extracted contaminants and impurities with the fuel raffinate.

It is a further object of the present invention to provide an apparatus for expediting the separation of contaminants and impurities from fuel mixtures by providing a separator chamber having a portion of a frustoconically shaped centrifugation means and baffle means and impact means, which in combination cause the gravitation of such heavier contaminants and impurities from the fuel mixture, with an effectiveness heretofore unknown in the art.

It is a specific object of the present invention to provide, in an engine having a fuel tank and a fuel filter, an apparatus for separating a contaminated liquid fuel into a substantially uncontaminated homogeneous raffinate fuel portion and into a heterogeneous extract portion, with said raffinate fuel portion having a lower specific gravity than said extract portion, said apparatus comprising: an elongated housing means placed between said fuel tank and said fuel falter, and having a top portion, a bottom portion, and first and second lateral wall portions; an inlet means disposed upon said first lateral wall portion, for receiving said contaminated liquid fuel from said fuel tank; an outlet means disposed upon said second lateral wall portion and proximal to said top portion of said housing means, for delivering said raffimate portion to said fuel filter; a discharge means disposed upon said bottom portion of said housing means, for draining said extract portion from said sump region; heating means disposed upon said second lateral wall portion, for heating said extract portion to promote flow and to prevent solidification thereof; a separator chamber means contained within said elongated housing means and having a partially frustoconical-shaped centrifugation means and a separation region; said partially frustoconical-shaped centrifugation means having an oblique longitudinal edge exposed to said separation region and diametrically opposed to said inlet means, for causing radial and turbulent flow of said contaminated liquid fuel thereabout; said partially frustoconical-shaped centrifugation means further having a vertical posterior edge disposed opposite of said oblique longitudinal edge, for terminating said radial and turbulent flow of said contaminated liquid fuel; a first horizontal baffle means disposed below and adjacent said frustoconical-shaped centrifugation means and projecting into said separation region, for controlling the gravitation rate of said extract portion from said contaminated liquid fuel, as said extraction portion gravitates from said separation region to an extract sump region disposed above said bottom portion of said housing means; a first vertical baffle means disposed above and contiguous with said vertical posterior edge of said partially frustoconical-shaped centrifugation means, for preventing admixing of said raffinate portion contained in said raffinate collection region with said extract portion contained in said extract collection region; a second vertical baffle means disposed below and contiguous with said vertical posterior edge of said partially frustoconical-shaped centrifugation means; said extract sump region formed by said first lateral wall portion and said bottom portion of said elongated housing means, and said vertical stop plate and a first contiguous extension thereof, protruding toward said top portion and a second contiguous extension thereof, protruding toward said bottom portion, for receiving said extract portion from said separator region; an extract collection region formed by said bottom portion and said second lateral wall portion of said housing means, and contiguous with said extract sump region, for accumulating said separated extract portion; a raffinate collection region formed by said top portion and the respective upper portions of said first and second lateral wall portions of said housing means, for receiving and delivering said separated raffinate portion to said outlet means; sensor means disposed upon said second lateral wall portion disposed medially of said outlet means and said discharge means, for sensing the level of said extract portion accumulating in said extract collection region; and a second horizontal baffle means disposed above and adjacent said partially frustoconical-shaped centrifugation means and having apertures therein, for controlling the flow of said fuel raffinate portion from said contaminated liquid fuel, as said fuel raffinate portion rises from said separation region to a raffinate collection region disposed in said top portion of said housing means.

These and other objects and features of the present invention will become apparent from the following detailed description, wherein reference is made to the figures in the accompanying drawings.

DETAILED DESCRIPTION

Figure 1:
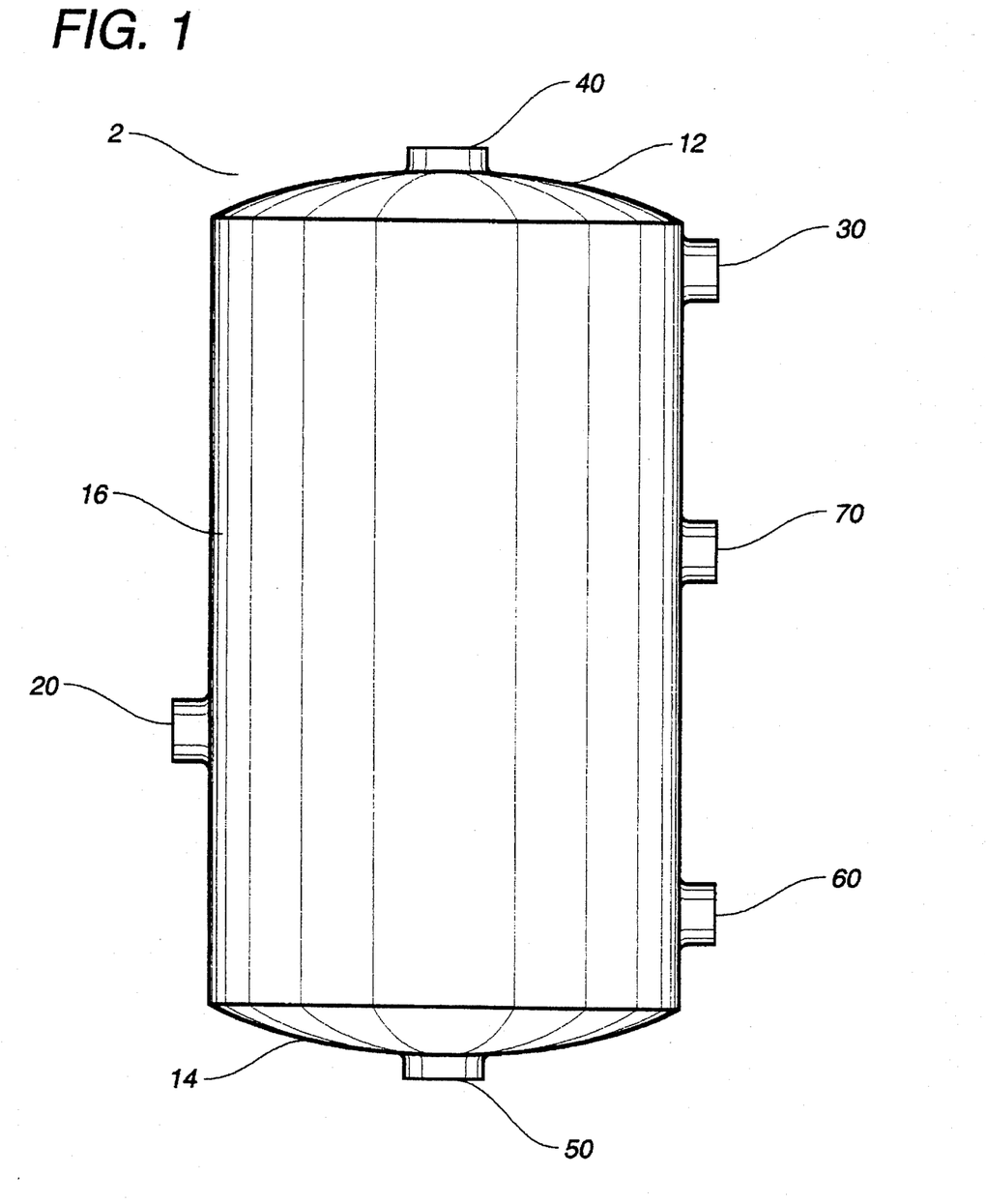
FIG. 1 depicts a simplified frontal view of an embodiment of the present invention.
Figure 5:
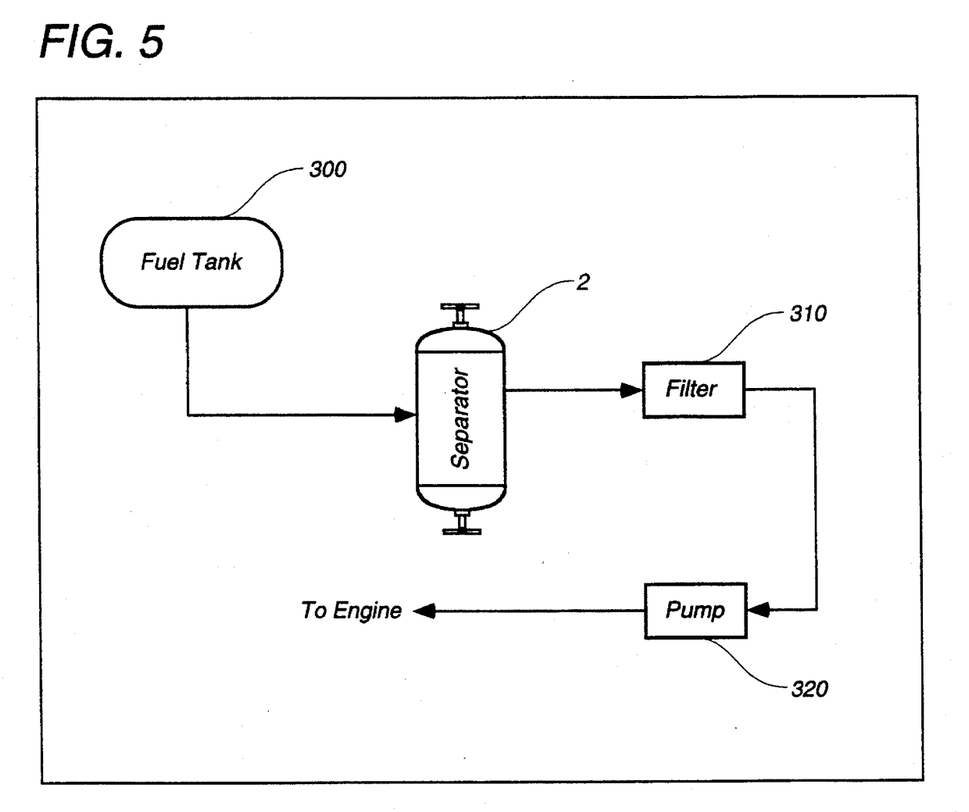
FIG. 5 depicts a simplified flow diagram of the placement of an embodiment of the present invention in the internal combustion engine.

Now referring to FIGS. 1 and 5, there is seen, respectively, a simplified frontal view of an embodiment of the present invention and a simplified flow diagram of the present invention located between diesel fuel tank 300 and fuel filter 310 in a diesel internal combustion engine and the like. Referring specifically to FIG. 1, there is depicted an embodiment of the present invention 2 comprising preferably cylindrical housing means 10 having top portion 12, body portion 16 and bottom portion 14. As will be described in detail, conventional fuel mixture F from fuel tank 300 enters an embodiment of the present invention 2 wherein fuel raffinate portion $F_R$ is separated and isolated from contaminant and by-product extract portion $F_E$. The raffinate fuel portion $F_R$ is delivered to fuel filter 310 and then pumped to the internal combustion engine by conventional injection pump 320.

Referring now to FIG. 1, there is depicted fuel intake 20 preferably disposed medially in a lateral side wall of body portion 16 of housing 10 through which the fuel mixture F enters preferred embodiment 2. As will described in detail, the extracted contaminants and by-product impurities portion $F_E$ is discharged from housing bottom portion 14 through drain means 50. Fuel raffinate portion $F_R$ is discharged through fuel outlet 30 and preferably passed to conventional filter means 310 (FIG. 5). Sensor means 70 detects the level of fuel extract portion $F_E$ accumulated in an extract collection region located in body portion 16 and signals the timeliness of discharging extract portion $F_E$ through drain means 50.

Still referring to FIG. 1, heating means 60 provides heat to fuel mixture F which enters housing means 10 through intake means 20, wherein such heat transfer tends to foster the separation of contaminants and impurities from diesel fuel and the like in a manner well known in the art. For example, applying heat to fuel mixture F prevents solidification of paraffin components and the like, particularly during cold weather. It has been found advantageous to have a probe well known in the art projecting into the extract collection region to transfer heat to the fluid immersed therein. It should be evident, however, that such heat probe and like means 60 may be placed in virtually any of the regions contained within housing 10 to apply satisfactory heat to fuel mixture F, extract $F_E$ and raffinate $F_R$ to overcome viscosity and surface tension effects, etc. Air vent means 40 located on housing top portion 12 enables entrapped air to be discharged from housing 10, particularly after a batch of accumulated extract $F_E$ has been drained through discharge means 50 and fuel raffinate $F_R$ has been discharged through outlet means 30.

Figure 2:
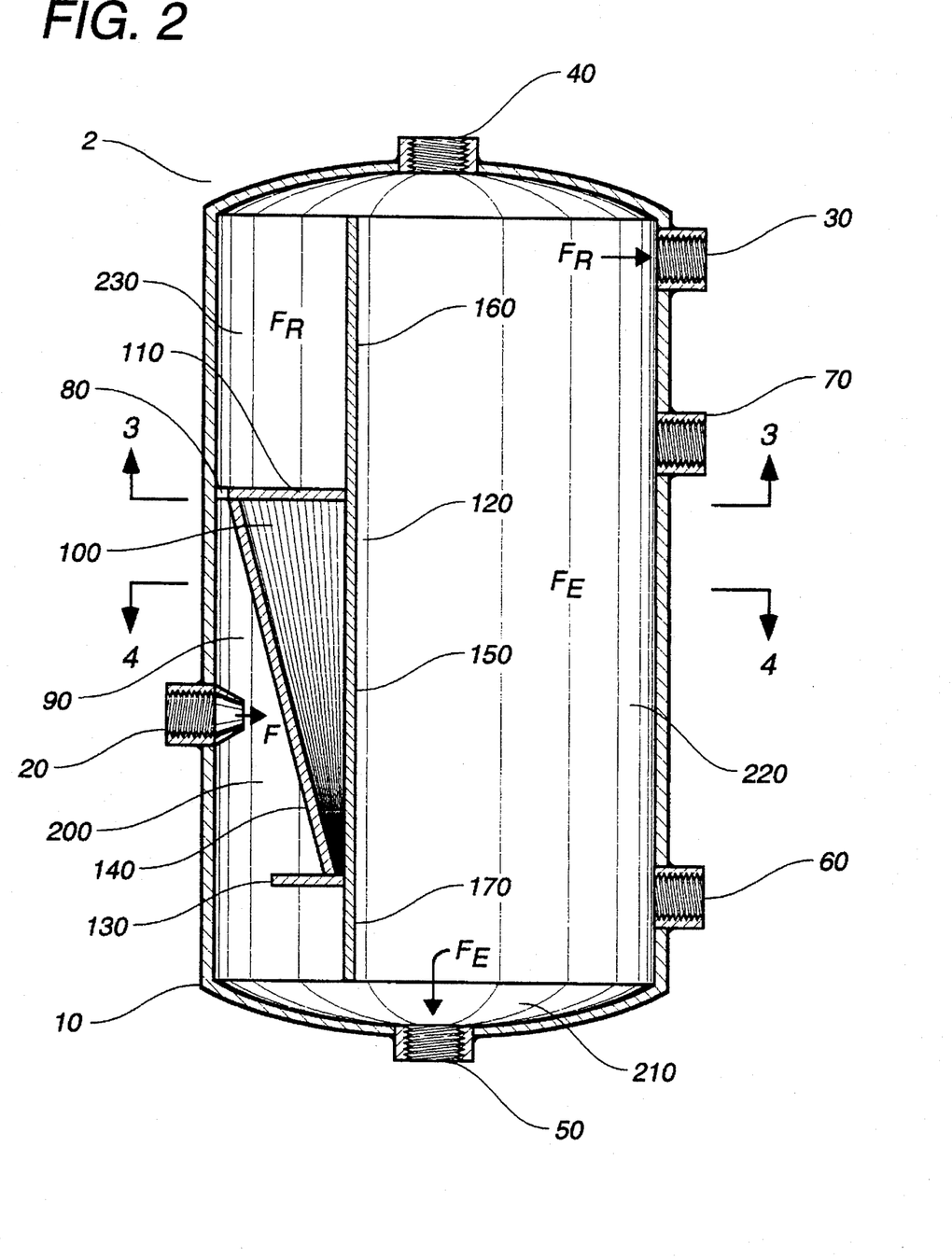
FIG. 2 depicts a cross-sectional front view of the embodiment depicted in FIG. 1.
Figure 3:
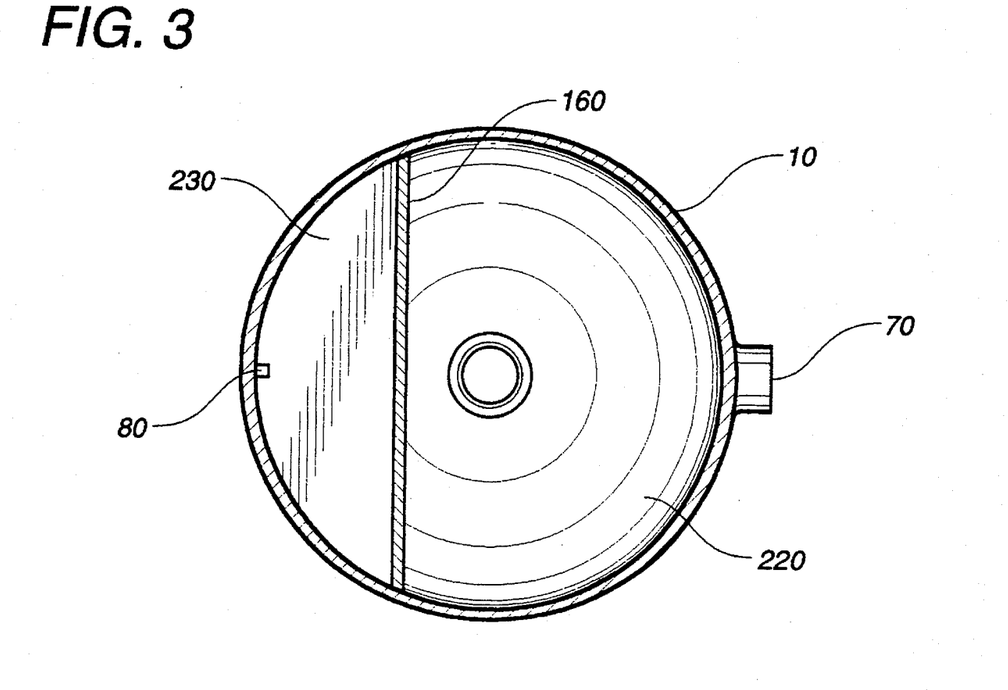
FIG. 3 depicts a cut-away view along line 3—3 in FIG. 2.
Figure 4:
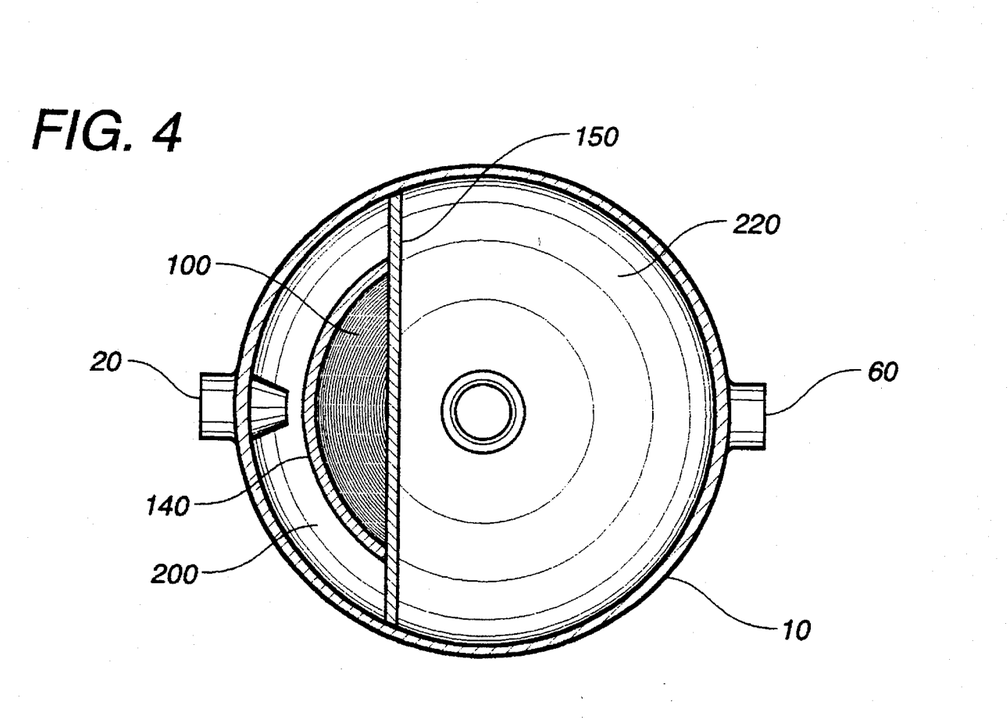
FIG. 4 depicts a cut-away view along line 4—4 in FIG. 2.

Now referring to FIGS. 2–4, the structure of interior of housing 10 is clearly depicted. Fuel mixture F entering housing means 10 through intake means 20 is received by separation chamber 90. More particularly, entering fuel mixture F immediately impacts oblique longitudinal plate means 40 of centrifugation means 100. In accordance with the present invention, centrifugation means 100 is preferably configured in a surface comprising a portion of a frusto-conical shape to promote its functioning like a centrifuge. As shown in FIG. 2, this partially frustoconically shaped surface of centrifugation means 100 corresponds to a longitudinally truncated portion of a full frustoconical surface with the vertex end portion of the truncated cone abutted by baffle plate means 130 on one end of centrifugal means 100; baffle plate means 110 is disposed opposite baffle plate means 130 and delimits the other, base end of centrifugal means 100. Thus, as fuel mixture F enters housing means 10 through inlet means 20 in a substantially lamellar flow, it is thrust against the partially frustoconically-shaped surface of centrifugation means 100, thereby causing an abrupt change of fuel mixture F to turbulent and circular flow.

As should be clear to those skilled in the art, the contaminants and impurities, with a higher specific gravity than the specific gravity of conventional diesel fuel and the like, are thrust radially from the point of entry, under the influence of centrifugal force. This turbulent fluid flow is abruptly changed again when the fluid flow is interrupted by substantially vertical impact means 150. Thus, according to the teachings of the present invention, the momentum of the fuel mixture F as it circularly flows about centrifugation means 100, is abruptly converted to the equivalent impulse as the flowing fluid strikes preferably vertical retainer or impact plate means 150 disposed opposite oblique longitudinal plate means 140 and facing extract collection region 220. The heavier liquid and solid contaminants and impurities $F_E$ are caused to gravitate downward through separation region 200 and into sump region 210 into which extract $F_E$ gravitates.

As shown in FIG. 2, horizontal baffle plate 130 preferably disposed below and adjacent centrifugation means 100 and disposed perpendicularly of vertical retainer plate 150, projects into separation region 200. Baffle plate 130 advantageously controls the rate of gravitation of extract $F_E$ and promotes the circular flow of gravitating solid and liquid contained therein to assure that any entrained fuel is separated therefrom.

According to the teachings of the present invention, while such extract $F_E$ gravitates toward sump region 210, fuel raffinate $F_R$, based upon its lower specific gravity, tends to flow upwardly into raffinate collection region 230. Substantially horizontal baffle plate 110 preferably disposed perpendicularly of vertical retainer plate 150, is constructed with a plurality of apertures 80 so as to function as a retainer means wherein it allows the passage therethrough of virginal fuel but inhibits the passage of heavier and bulkier extract. By inhibiting the upwards flow of entrained extract, horizontal baffle plate 110 promotes the circular flow of extract about centrifugation means 100, wherein this extract ultimately will gravitate through separation region 200 and join the separated extract $F_E$ in sump region 210, located at bottom region 14 of housing means 10. It should be evident to those skilled in the art that while plurality of apertures 80 can inhibit the upward flow of any extract portion proximal to baffle plate 110, most of the extract flows downwardly toward sump region 210 because of its relatively high specific gravity.

Still referring to FIG. 2, there are also depicted vertical baffle plates 160 and 170 which preferably are constructed contiguously with impact plate 150, forming substantially collinear baffle plate assembly 120. Baffle plate 170 promotes a controlled flow of extract $F_E$ into extract collection region 220, so as to avoid turbulence thereto, wherein the boundary between extract $F_E$ and fuel raffinate $F_R$, generally in the vicinity of extract level sensor means 70, would be disturbed causing re-mixing of the already separated contaminants and impurities from the diesel fuel. Similarly, baffle plate 160 promotes a controlled flow of fuel raffinate $F_R$ into raffinate collection region 230, so as to avoid turbulence thereto, wherein the essentially lamellar flow of fuel raffinate $F_R$ through raffinate collection 230 and discharge through outlet means 30 does not re-mix with accumulated extract $F_E$ in extract collection region 220, located proximal to sensor means 70.

Referring now to FIGS. 3 and 4, there are shown cut-away views along lines 3—3 and 4—4, respectively, of the embodiment depicted in FIG. 2. As clearly shown in FIG. 3, fuel raffinate collection region 230 is isolated from extract collection region 220 by vertical baffle plate means 160 which is preferably contiguous with impact plate 150 (FIG. 2). Also shown is extract level sensor means 70 and aperture 80, through which raffinate $F_R$ passes from separation region 200 (FIG. 2) into raffinate collection region 230, as has been hereinbefore described. Now referring to FIG. 4, there is depicted preferably partially frustoconically shaped centrifugation means 100 and adjacent separation region 200. Inlet means 20 delivers lamellar flowing fuel mixture F into housing 10 from a fuel tank. The isolation between accumulated $F_E$ in extract collection region 220 and separation region 200 by the presence of vertical impact plate surface 150 is clearly shown. As hereinbefore described, impact surface 150 is preferably contiguous with retainer assembly 120.

According to the teachings of the present invention, an improved apparatus is provided which effectively converts lamellar flow of diesel fuel and the like into turbulent, circular flow to achieve the efficient separation achieved by a centrifuge-like environment in a specially designed apparatus, wherein heavier, contaminating components are separated into an extract portion and drained at appropriate intervals. Simultaneously, a virginal fuel raffinate portion is isolated from this extract portion and is removed therefrom through an outlet which is disposed remotely of the extract drain. Furthermore, unlike the prior art, the present invention is preferably configured with a combination of substantially horizontal and vertical baffle plates which control the gravitation of the contaminants and by-product impurities, and prevent the re-mixing of the separated fuel extract and raffinate portions.

It is an important feature and advantage of the present invention that a centrifugation means is provided that emulates the efficient circular and turbulent fluid flow commonly achieved in centrifuges well known in the art. In so doing, as should be appreciated by those skilled in the art, centrifugal force is utilized to maximize the separation of heavier foreign components from lighter diesel fuel and the like. It is a further feature of the present invention that the bulk of these foreign components are forced to gravitate from the fuel mixture by abruptly impacting a substantially vertical retainer surface which immediately stops the circular flow. As has been described in detail, this sudden impact, wherein the fluid flow momentum is convened into an equivalent impulse, triggers the separation of fuel raffinate from extract. As has also been described in detail, the structures of the present invention promote the continued isolation of the raffinate and extract portions.

It should also be evident to those skilled in the art that since the present invention teaches how to effectively separate contaminants and impurities from diesel fuel and the like, only the fuel raffinate passes through a downstream fuel filter, thereby affording an excellent opportunity for the internal combustion engine to operate with clean fuel. Accordingly, an efficiently operating engine and concomitant minimal environmental intrusion of volatile organic by-products and the like are benefits of the present invention. In addition, the longevity of fuel filters and, of course, internal combustion engines should be significantly increased using the present invention as described herein.

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims herein.

What is claimed is:

1. In an engine having a fuel tank and a fuel filter, an apparatus for separating contaminated liquid fuel into a substantially uncontaminated homogeneous raffinate fuel portion and into a heterogeneous extract portion, with said raffinate fuel portion having a lower specific gravity than said extract portion, said apparatus comprising:

an elongated housing means placed between said fuel tank and said fuel filter, and having a top portion, a bottom portion disposed below said top portion, and first and second lateral wall portions disposed medially and perpendicularly of said top portion and said bottom portion;

an inlet means disposed upon said first lateral wall portion of said elongated housing means, for receiving said contaminated liquid fuel from said fuel tank into a separation region;

an outlet means disposed upon said second lateral wall portion of said elongated housing means, for delivering said raffinate portion to said fuel filter;

heating means disposed upon said second lateral wall portion of said elongated housing means, for heating said contaminated liquid fuel and said extract portion to promote flow and to prevent solidification thereof;

a separator chamber means contained within said elongated housing means and having a centrifugation means and said separation region therein;

said centrifugation means including longitudinal plate means having a partially frustoconically-shaped convex surface facing said first lateral wall portion and said separation region with a vertex end facing said bottom portion and an opposite base end facing said top portion, for causing circular turbulent flow of said contaminated liquid fuel thereabout;

said longitudinal plate means of said partially frustoconically-shaped surface of said centrifugation means disposed obliquely relative to said first lateral wall portion of said elongated housing means and having a longitudinal axis;

said centrifugation means further having an impact plate means disposed oppositely of said longitudinal plate means and facing an extract collection region, for interrupting said circular turbulent flow of said contaminated liquid fuel;

a first baffle plate means disposed perpendicularly to said longitudinal axis of said longitudinal plate means and disposed adjacent said vertex end of said partially frustoconically-shaped surface of said centrifugation means and projecting into said separation region, for controlling the gravitation rate of said extract portion from said contaminated liquid fuel as said extract portion gravitates from said separation region to an extract sump region disposed upon said bottom portion of said housing means;

a discharge means disposed upon said bottom portion of said elongated housing means, for draining said extract portion from said extract sump region;

an extract collection region bounded by said second lateral wall portion of said elongated housing means and said impact plate means, and disposed contiguously with said extract sump region, for accumulating said separated extract portion;

a raffinate collection region bounded by said top portion and said first and second lateral wall portions of said elongated housing means, for receiving said raffinate portion from said separation region and for delivering said raffinate portion to said outlet means;

a second baffle plate means disposed parallel to and along said longitudinal axis of said longitudinal plate means and disposed adjacent said impact plate means and said top portion, for preventing admixing of said raffinate portion contained in said raffinate collection region with said extract portion contained in said extract collection region;

a third baffle plate means disposed parallel to and along said longitudinal axis of said longitudinal plate means and disposed adjacent said impact plate means and said bottom portion, for controlling the rate of flow of said extract portion from said extract sump region to said extract collection region;

sensor means disposed upon said second lateral wall portion disposed medially of said outlet means and said discharge means, for sensing the level of said extract portion accumulating in said extract collection region; and a fourth baffle plate means disposed perpendicularly to said longitudinal axis of said longitudinal plate means and disposed adjacent said base end of said partially frustoconically-shaped surface of said centrifugation means, for controlling the flow of said contaminated liquid fuel from said separation region to said raffinate collection region.

2. The apparatus recited in claim 1, wherein said outlet means is further disposed proximal to said top portion of said housing means.

3. The apparatus recited in claim 1, wherein said first baffle plate means is further disposed abuttably of said vertex end of said partially frustoconical-shaped surface of said centrifugation means.

4. The apparatus recited in claim 1, wherein said second baffle plate means is further disposed contiguously with said impact plate means.

5. The apparatus recited in claim 1, wherein said third baffle plate means is further disposed contiguously with said impact plate means.

6. The apparatus recited in claim 1, wherein said fourth baffle plate means is further disposed abuttably of said base end of said partially frustoconically-shaped surface of said centrifugation means.

7. The apparatus recited in claim 1, wherein said fourth baffle plate means comprises a plurality of apertures therein, for limiting entry to only said raffinate portion into said raffinate collection region from said separation region, as said contaminated fuel rises in said separation region.

8. In an engine having a fuel tank and a fuel filter, an apparatus for separating contaminated liquid fuel into a substantially uncontaminated homogeneous raffinate fuel portion and into a heterogeneous extract portion, with said raffinate fuel portion having a lower specific gravity than said extract portion, said apparatus comprising:

an elongated housing means placed between said fuel tank and said fuel filter, and having a top portion, a bottom portion disposed below said top portion, and first and second lateral wall portions disposed medially and perpendicularly of said top portion and said bottom portion;

an inlet means disposed upon said first lateral wall portion of said elongated housing means, for receiving said contaminated liquid fuel from said fuel tank into a separation region;

an outlet means disposed upon said second lateral wall portion of said elongated housing means, for delivering said raffinate portion to said fuel filter;

heating means disposed upon said second lateral wall portion of said elongated housing means, for heating said contaminated liquid fuel and said extract portion to promote flow and to prevent solidification thereof;

a separator chamber means contained within said elongated housing means and having a centrifugation means and said separation region therein;

said centrifugation means including longitudinal plate means having a partially frustoconically-shaped convex surface facing said first lateral wall portion and said separation region with a vertex end facing said bottom portion and an opposite base end facing said top portion, for causing circular turbulent flow of said contaminated liquid fuel thereabout;

said longitudinal plate means of said partially frustoconically-shaped surface of said centrifugation means disposed obliquely relative to said first lateral wall portion of said elongated housing means and having a longitudinal axis;

said centrifugation means further having an impact plate means disposed oppositely of said longitudinal plate means and facing an extract collection region, for interrupting said circular turbulent flow of said contaminated liquid fuel;

a first baffle plate means disposed perpendicularly to said longitudinal axis of said longitudinal plate means and abuttably of said vertex end of said partially frustoconically-shaped surface of said centrifugation means and projecting into said separation region, for controlling the gravitation rate of said extract portion from said contaminated liquid fuel as said extract portion gravitates from said separation region to an extract sump region disposed upon said bottom portion of said housing means;

a discharge means disposed upon said bottom portion of said elongated housing means, for draining said extract portion from said extract sump region;

an extract collection region bounded by said second lateral wall portion of said elongated housing means and said impact plate means, and disposed contiguously with said extract sump region, for accumulating said separated extract portion;

a raffinate collection region bounded by said top portion and said first and second lateral wall portions of said elongated housing means, for receiving said raffinate portion from said separation region and for delivering said raffinate portion to said outlet means;

a second baffle plate means disposed parallel to and along said longitudinal axis of said longitudinal plate means and disposed contiguously with said impact plate means and said top portion, for preventing admixing of said raffinate portion contained in said raffinate collection region with said extract portion contained in said extract collection region;

a third baffle plate means disposed parallel to and along said longitudinal axis of said longitudinal plate means and contiguously with said impact plate means and adjacent said bottom portion, for controlling the rate of flow of said extract portion from said extract sump region to said extract collection region;

sensor means disposed upon said second lateral wall portion disposed medially of said outlet means and said discharge means, for sensing the level of said extract portion accumulating in said extract collection region; and a fourth baffle plate means disposed perpendicularly to said longitudinal axis of said longitudinal plate means and abuttably of said base end of said partially frustoconically-shaped surface of said centrifugation means, for controlling the flow of said contaminated liquid fuel from said separation region to said raffinate collection region;

said fourth baffle plate means having a plurality of apertures therein for limiting entry to only said raffinate portion of said raffinate collection region from said separation region, as said contaminated fuel rises in said separation region.

9. The apparatus recited in claim 8, wherein said outlet means is further disposed proximal to said top portion of said housing means.

10. In an engine having a fuel tank and a fuel filter, an apparatus for separating contaminated liquid fuel into a substantially uncontaminated homogeneous raffinate fuel portion and into a heterogeneous extract portion, with said raffinate fuel portion having a lower specific gravity than said extract portion, said apparatus comprising:

an elongated housing means placed between said fuel tank and said fuel filter, and having a top portion, a bottom portion disposed below said top portion, and first and second lateral wall portions disposed medially and perpendicularly of said top portion and said bottom portion;

an inlet means disposed upon said first lateral wall portion of said elongated housing means, for receiving said contaminated liquid fuel from said fuel tank into a separation region;

an outlet means disposed upon said second lateral wall portion of said elongated housing means and proximal to said top portion of said elongated housing means, for delivering said raffinate portion to said fuel filter;

heating means disposed upon said second lateral wall portion of said elongated housing means, for heating said contaminated liquid fuel and said extract portion to promote flow and to prevent solidification thereof;

a separator chamber means contained within said elongated housing means and having a centrifugation means and said separation region therein;

said centrifugation means including longitudinal plate means having a partially frustoconically-shaped convex surface facing said first lateral wall portion and said separation region with a vertex end facing said bottom portion and an opposite base end facing said top portion, for causing circular turbulent flow of said contaminated liquid fuel thereabout;

said longitudinal plate means of said partially frustoconically-shaped surface of said centrifugation means disposed obliquely relative to said first lateral wall portion of said elongated housing means and having a longitudinal axis;

said centrifugation means further having an impact plate means disposed oppositely of said longitudinal plate means and facing an extract collection region, for interrupting said circular turbulent flow of said contaminated liquid fuel;

a first baffle plate means disposed perpendicularly to said longitudinal axis of said longitudinal plate means and abuttably of said vertex end of said partially frustoconically-shaped surface of said centrifugation means and projecting into said separation region, for controlling the gravitation rate of said extract portion from said contaminated liquid fuel as said extract portion gravitates from said separation region to an extract sump region disposed upon said bottom portion of said housing means;

a discharge means disposed upon said bottom portion of said elongated housing means, for draining said extract portion from said extract sump region;

an extract collection region bounded by said second lateral wall portion of said elongated housing means and said impact plate means, and disposed contiguously with said extract sump region, for accumulating said separated extract portion;

a raffinate collection region bounded by said top portion and said first and second lateral wall portions of said elongated housing means, for receiving said raffinate portion from said separation region and for delivering said raffinate portion to said outlet means;

a second baffle plate means disposed parallel to and along said longitudinal axis of said longitudinal plate means and contiguously with said impact plate means and said top portion, for preventing admixing of said raffinate portion contained in said raffinate collection region with said extract portion contained in said extract collection region;

a third baffle plate means disposed parallel to and along said longitudinal axis of said longitudinal plate means and disposed contiguously with said impact plate means and adjacent said bottom portion, for controlling the rate of flow of said extract portion from said extract sump region to said extract collection region;

sensor means disposed upon said second lateral wall portion disposed medially of said outlet means and said discharge means, for sensing the level of said extract portion accumulating in said extract collection region; and a fourth baffle plate means disposed perpendicularly to said longitudinal axis of said longitudinal plate means and abuttably of said base end of said partially frustoconically-shaped surface of said centrifugation means, for controlling the flow of said contaminated liquid fuel from said separation region to said raffinate collection region;

said fourth baffle plate means having a plurality of apertures therein for limiting entry to only said raffinate portion of said raffinate collection region from said separation region, as said contaminated fuel rises in said separation region.

* * * * *